US011889257B2

(12) United States Patent
Ku

(10) Patent No.: US 11,889,257 B2
(45) Date of Patent: Jan. 30, 2024

(54) WEARABLE AUDIO DEVICE ZERO-CROSSING BASED PARASITIC OSCILLATION DETECTION

(71) Applicant: Bose Corporation, Framingham, MA (US)

(72) Inventor: Emery M. Ku, Somerville, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/110,665

(22) Filed: Feb. 16, 2023

(65) Prior Publication Data

US 2023/0199367 A1 Jun. 22, 2023

Related U.S. Application Data

(63) Continuation of application No. 17/412,062, filed on Aug. 25, 2021, now Pat. No. 11,589,154.

(51) Int. Cl.

| | |
|---|---|
| ***H04R 29/00*** | (2006.01) |
| ***H04R 3/00*** | (2006.01) |
| ***H04R 1/10*** | (2006.01) |
| ***H04R 3/02*** | (2006.01) |

(52) U.S. Cl.
CPC ............. *H04R 1/1083* (2013.01); *H04R 3/02* (2013.01); *H04R 29/004* (2013.01)

(58) Field of Classification Search
CPC ... H04R 1/00; H04R 1/04; H04R 1/08; H04R 1/10; H04R 1/1083; H04R 1/22; H04R 1/222; H04R 1/2869; H04R 29/00; H04R 29/004; H04R 2410/01; G10K 11/1781; G10K 11/1783; G10K 11/17833; G10K 11/17835; G10K 11/17879; G10K 11/17881; G10K 2210/081
See application file for complete search history.

(56) References Cited

U.S. PATENT DOCUMENTS 4,484,034 A * 11/1984 Ferrieu .................... H04M 9/08 379/392
4,835,484 A * 5/1989 Coulmance ............. H04M 9/08 379/388.07
5,442,712 A * 8/1995 Kawamura .............. H04R 3/02 381/83
8,199,927 B1 * 6/2012 Raftery ................. H04M 9/082 379/406.01
9,020,160 B2 * 4/2015 Gauger, Jr. ...... G10K 11/17881 381/71.8
2008/0019539 A1 * 1/2008 Patel ......................... H04R 3/00 381/96

(Continued)

FOREIGN PATENT DOCUMENTS

JP 3935290 B2 * 6/2007 ............... H04R 3/02
JP 4567804 B1 * 10/2010 ............... H04R 3/02

*Primary Examiner* — Thang V Tran

(57) ABSTRACT

A method for detecting and mitigating parasitic oscillation in a headphone equipped with an active noise reduction (ANR) system. A fundamental frequency of a microphone signal is determined from a microphone of the ANR system and an amplitude of the determined fundamental frequency is compared to a threshold level to determine parasitic oscillation. If parasitic oscillation is determined, then the microphone signal is altered to mitigate the parasitic oscillation.

25 Claims, 6 Drawing Sheets

(56) References Cited

U.S. PATENT DOCUMENTS

| | | | | |
|---|---|---|---|---|
| 2012/0014553 | A1* | 1/2012 | Bonanno | H04R 1/1041 381/364 |
| 2012/0140937 | A1* | 6/2012 | Poe | H04R 25/70 381/60 |
| 2013/0156205 | A1* | 6/2013 | Ura | H04R 3/02 381/56 |
| 2014/0363010 | A1* | 12/2014 | Christopher | H04R 1/1083 381/71.6 |
| 2020/0272284 | A1* | 8/2020 | Stumpe, Jr. | G06F 7/08 |
| 2022/0206739 | A1* | 6/2022 | Tan | G10L 21/034 |

* cited by examiner

WEARABLE AUDIO DEVICE ZERO-CROSSING BASED PARASITIC OSCILLATION DETECTION

CROSS-REFERENCE TO RELATED APPLICATIONS

This application is a Continuation of U.S. patent application Ser. No. 17/412,062 filed Aug. 25, 2021 and titled “Wearable Audio Device Zero-Crossing Based Parasitic Oscillation Detection,” which application is herein incorporated by reference in its entirety.

BACKGROUND

This disclosure relates to a wearable audio device.

Wearable audio devices such as earbuds and hearing aids can develop parasitic oscillations in a feedforward and/or a feedback loop that can lead to undesirable instability and squealing.

SUMMARY

All examples and features mentioned below can be combined in any technically possible way.

In one aspect a system for detecting parasitic oscillation in a wearable audio device that comprises an electro-acoustic transducer that is configured to develop sound for a user, a housing that holds the transducer, at least one of a feedforward microphone that is configured to detect sound outside of the housing and output a feedforward microphone signal or a feedback microphone that is configured to detect sound inside of the housing and output a feedback microphone signal, and an opening in the housing that emits sound pressure from the transducer, includes a parasitic oscillation detector that is configured to determine a fundamental frequency of at least one of the feedforward and feedback microphone signals and compare an amplitude of the determined fundamental frequency to a threshold level, to determine parasitic oscillation.

Some examples include one of the above and/or below features, or any combination thereof. In an example the parasitic oscillation detector is further configured to determine whether the fundamental frequency is at least at the threshold level for at least a predetermined amount of time. In an example the wearable audio device comprises an earbud that is configured to output sound directly into the user’s ear canal. In an example a microphone is used in an active noise reduction (ANR) system. In an example a feedforward microphone is used in a transparency mode where environmental sounds are reproduced by the transducer.

Some examples include one of the above and/or below features, or any combination thereof. In some examples the fundamental frequency is determined based on zero crossings of a microphone signal. In an example the fundamental frequency is determined by measuring a number of samples of a running clock between zero crossings. In an example the fundamental frequency is determined based on a monitoring of zero crossings over time. In an example zero crossings are determined based on changes in sign of the microphone signal.

Some examples include one of the above and/or below features, or any combination thereof. In some examples the parasitic oscillation detector is configured to detect parasitic oscillations in a predetermined frequency range. In an example the frequency range is from about 300 Hz to about 1,000 Hz. In some examples the system further includes an instability mitigator that is configured to alter a microphone signal in response to a determination of parasitic oscillation. In an example the instability mitigator is configured to mute the microphone. In an example the microphone is muted for a predetermined amount of time. In an example after the predetermined amount of time the microphone is returned to an un-muted state.

In another aspect, a system for detecting parasitic oscillation in an earbud that is configured to output sound directly into the user’s ear canal, wherein the earbud comprises an electro-acoustic transducer that is configured to develop sound for a user, a housing that holds the transducer, a feedforward microphone that is configured to detect sound outside of the housing and output a feedforward microphone signal that is used in a transparency mode where environmental sounds are reproduced by the transducer, a feedback microphone that is configured to detect sound inside of the housing and output a feedback microphone signal that is used for active noise reduction, and an opening in the housing that emits sound pressure from the transducer that can reach the feedforward microphone, includes a parasitic oscillation detector that is configured to determine a fundamental frequency of a microphone signal based on zero crossings of the microphone signal, compare an amplitude of the fundamental frequency of the microphone signal to a threshold level and determine whether the fundamental frequency is at least at the threshold level for at least a predetermined amount of time, to determine parasitic oscillation.

Some examples include one of the above and/or below features, or any combination thereof. In an example the fundamental frequency is determined by measuring a number of samples of a running clock between zero crossings. In an example the fundamental frequency is determined based on a monitoring of zero crossings over time. In an example zero crossings are determined based on changes in sign of the microphone signal. In an example the parasitic oscillation detector is configured to detect parasitic oscillations in a frequency range of from about 300 Hz to about 1,000 Hz.

DETAILED DESCRIPTION

Figure 1:
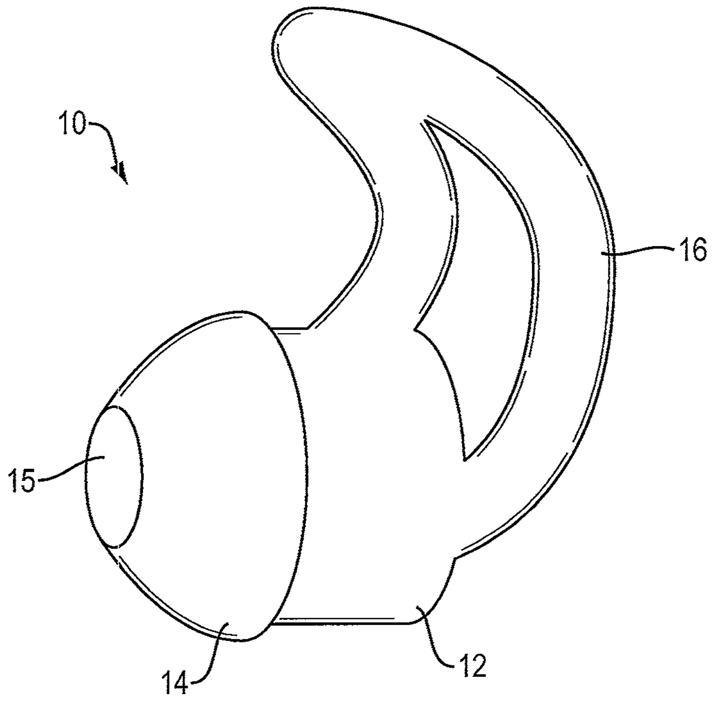
FIG. 1 is perspective view of a wearable audio device.

This disclosure relates to a wearable audio device. Some non-limiting examples of this disclosure describe a type of wearable audio device that is known as an earphone or earbud. Earbuds generally include an electro-acoustic transducer for producing sound, and are configured to deliver the sound directly into the user’s ear canal. Earbuds can be wireless or wired. In non-limiting examples described herein the earbuds include one or more feedforward (external) microphones that sense external sounds outside of the housing. In non-limiting examples described herein the earbuds include one or more feedback (internal) microphones that sense internal sounds inside of the housing. Feedforward and feedback microphones can be used for functions such as active noise reduction (ANR). Feedforward microphones can also be used in transparency mode operation where external sounds are reproduced for the user by the electro-acoustic transducer. Other aspects of earbuds that are not involved in this disclosure are not shown or described.

Some examples of this disclosure also describe a type of wearable audio device that is known as an open audio device. Open audio devices have one or more electro-acoustic transducers (i.e., audio drivers) that are located off of the ear canal opening. In some examples the open audio devices also include one or more microphones; the microphones can be used to pick up the user's voice and/or for ANR and/or for transparency mode operation. Open audio devices are further described in U.S. Pat. No. 10,397,681, the entire disclosure of which is incorporated herein by reference for all purposes.

An open audio device includes but is not limited to an off-ear headphone, i.e., a device that has one or more electro-acoustic transducers that are coupled to the head or ear (typically by a support structure) but do not occlude the ear canal opening. In some examples an open audio device is an off-ear headphone comprising audio eyeglasses, but that is not a limitation of the disclosure as in an open audio device the device is configured to deliver sound to one or both ears of the wearer where there are typically no ear cups and no ear buds. The wearable audio devices contemplated herein may include a variety of devices that include an over-the-ear hook, such as a wireless headset, hearing aid, eyeglasses, a protective hard hat, and other open ear audio devices.

Some examples of this disclosure describe a headphone. A headphone refers to a device that typically fits around, on, or in an ear and that radiates acoustic energy directly or indirectly into the ear canal. Headphones are sometimes referred to as earphones, earpieces, headsets, earbuds, or sport headphones, and can be wired or wireless. A headphone includes a driver to transduce electrical audio signals to acoustic energy. The driver may or may not be housed in an earcup or in a housing that is configured to be located on the head or on the ear, or to be inserted directly into the user's ear canal. A headphone may be a single stand-alone unit or one of a pair of headphones (each including at least one acoustic driver), one for each ear. A headphone may be connected mechanically to another headphone, for example by a headband and/or by leads that conduct audio signals to an acoustic driver in the headphone. A headphone may include components for wirelessly receiving audio signals. A headphone may include components of an ANR system, which may include one or more internal microphones within the headphone housing and one or more external microphones that sense sound outside the housing. Headphones may also include other functionality, such as additional microphones for an ANR system, an aware mode system, and one or more microphones that are used to pick up the user's voice.

One or more of the devices, systems, and methods described herein, in various examples and combinations, may be used in a wide variety of wearable audio devices or systems, including wearable audio devices in various form factors. One such form factor is an earbud. Another is a headphone. Unless specified otherwise, a wearable audio device or system includes headphones and various other types of wearable audio devices such as head, shoulder or body-worn acoustic devices (e.g., audio eyeglasses or other ear-mounted or head-mounted audio devices) that include one more acoustic transducers to receive and/or produce sound, with or without contacting the ears of a user.

It should be noted that although specific implementations of wearable audio devices primarily serving the purpose of acoustically outputting audio are presented with some degree of detail, such presentations of specific implementations are intended to facilitate understanding through provisions of examples and should not be taken as limiting either the scope of the disclosure or the scope of the claim coverage.

In some examples the wearable audio device includes an electro-acoustic transducer that is configured to develop sound for a user, a housing that holds the transducer, a feedforward microphone that is configured to detect sound outside of the housing and output a feedforward microphone signal, a feedback microphone that is configured to sense sound inside the housing and output a feedback microphone signal, and at least one opening in the housing that emits sound pressure from the transducer that can reach the feedforward microphone. The processor system is programmed to accomplish a parasitic oscillation detector functionality that is configured to determine the fundamental frequency of one or more of the microphone signals by monitoring zero crossings of the microphone signal, and then determine if the fundamental frequency remains above a threshold level for at least a minimum time period. If these conditions are met, the system is oscillating. In some examples oscillation mitigation actions are then taken.

FIG. 1 is a perspective view of a wireless in-ear earbud 10. An earbud is a non-limiting example of a wearable audio device. Another example of a wearable audio device is headphones, for example over the ear headphones. Earbud 10 includes body or housing 12 that houses the active components of the earbud. Portion 14 is coupled to body 12 and is pliable so that it can be inserted into the entrance of the ear canal. Sound is delivered through opening 15. Retaining loop 16 is constructed and arranged to be positioned in the outer ear, for example in the antihelix, to help retain the earbud in the ear. Earbuds are well known in the field (e.g., as disclosed in U.S. Pat. No. 10,993,009, the disclosure of which is incorporated herein by reference in its entirety, for all purposes), and so certain details of the earbud are not further described herein.

Figure 2:
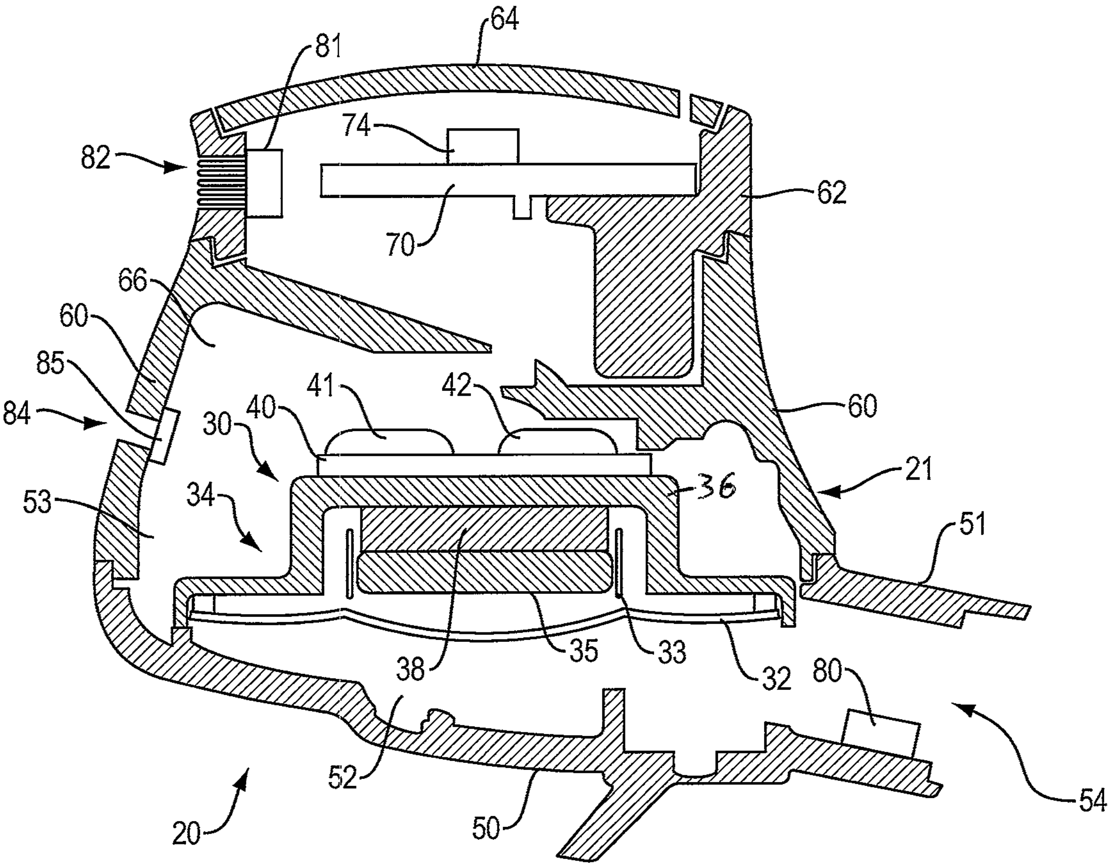
FIG. 2 is a partial cross-sectional view of elements of a wearable audio device.

FIG. 2 is a partial cross-sectional view of only certain elements of an earbud 20 that are useful to a better understanding of the present disclosure. Earbud 20 comprises housing 21 that encloses electro-acoustic transducer (audio driver) 30. Housing 21 comprises front housing portion 50 and rear housing portions 60 and 62 that define rear housing interior 66. Transducer 30 has diaphragm 32 that is driven in order to create sound pressure in front cavity 52. Sound is also created in rear cavity 53. Sound pressure is directed out of front housing portion 50 via sound outlet 54. Internal microphone 80 is located inside of housing 21. In an example microphone 80 is in sound outlet 54, as shown in FIG. 2, and is configured to sense sound in the cavity formed by front cavity 52 and the user's ear canal (not shown). External microphone 81 is configured to sense sound external to housing 21. In an example exterior microphone 81 is located inside of the housing and is acoustically coupled to the external environment via housing openings 82 that let environmental sound reach microphone 81. In an example interior microphone 80 senses sound inside of the housing (e.g., in front cavity 52) and is used as a feedback microphone for active noise reduction. In an example exterior microphone 81 is used as a feed-forward microphone for active noise reduction, and/or for transparency mode operation where environmental sound is played to the user so the user is more environmentally aware, and can hear others speaking and the like. An earbud, such as shown by earbud 10 in FIG. 1, typically includes a pliable tip (not shown) that is engaged with neck 51 of housing portion 50, to help direct the sound into the ear canal (not shown). Earbud housing 21 further comprises a rear enclosure made from rear housing portions 60 and 62, and grille 64. Note that the details of earbud 20 are exemplary of aspects of earphones and are not limiting of the scope of this disclosure, as the present parasitic oscillation detection can be used in varied types and designs of earbuds, earphones, headphones, and other types of wearable audio devices.

Transducer 30 further comprises magnetic structure 34. Magnetic structure 34 comprises transducer magnet 38 and magnetic material that functions to confine and guide the magnetic field from magnet 38, so that the field properly interacts with coil 33 to drive diaphragm 32, as is well known in the electro-acoustic transducer field. The magnetic material comprises cup 36 and front plate 35, both of which are preferably made from a material with relatively high magnetic susceptibility, also as is known in the field. Transducer printed circuit board (PCB) 40 carries electrical and electronic components (not shown) that are involved in driving the transducer. Pads 41 and 42 are locations where wires (not shown) can be coupled to PCB 40.

Earbud 20 also includes processor 74 located on PCB 70. In some examples processor 74 is configured to process outputs of microphones 80 and 81. Of course the processor is typically involved in other processing needed for earbud functionality, such as processing digital sound files that are to be played by the earbud, as would be apparent to one skilled in the technical field. In an example the processor is configured to detect parasitic oscillation. In some examples the processor is also configured to mitigate parasitic oscillation or instability. In an example parasitic oscillation can be caused when the feedforward microphone (that is used to sense environmental sounds external to the earbud) picks up sound from the earbud's audio driver. This can happen, for example, when acoustic pressure that leaves the housing through resistive port 84 in rear cavity 53 is sensed by microphone 81. In some examples port 84 is covered by resistive weave 85. Direct coupling through other ports or even leaks in the acoustic cavity can also result in parasitic oscillation. In an example parasitic oscillation is caused in the feedback system when the pressure sensed at the internal microphone 80 as a function of the driver voltage changes sufficiently to drive the control loop unstable. Resulting parasitic oscillation can cause undesirable audio oscillations or squealing. Squealing can occur even when the earbud is properly in place in the user's ear. Squealing can also occur when an earbud is placed into its case and is not shut off; this can happen when communication between the earbud and the case is improper, such as when the battery of the case is drained.

Figure 3:
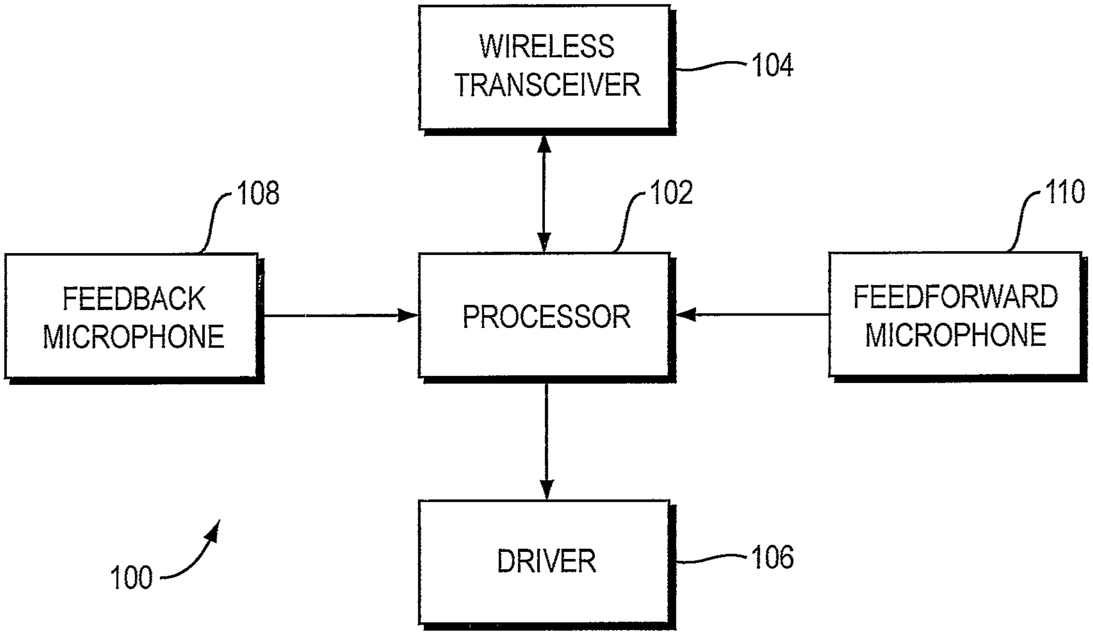
FIG. 3 is a block diagram of aspects of a wearable audio device.

FIG. 3 is a block diagram of aspects of a wearable audio device 100. In an example device 100 is an earbud or headphone, but this is not a limitation of the disclosure. Wearable audio device 100 includes processor 102 that receives audio data from external sources via wireless transceiver 104. Processor 102 also receives the outputs of the feedback microphone(s) 108 and the feedforward microphone(s) 110. Processor 102 outputs audio data that is converted into analog signals that are supplied to audio driver 106. In an example device 100 includes memory comprising instructions, which, when executed by the processor, accomplish the processing described herein that is configured to detect parasitic oscillation. In some examples the detected instability is also mitigated via the properly programmed processor. In some examples device 100 is configured to store a computer program product using a non-transitory computer-readable medium including computer program logic encoded thereon that, when performed on the wearable audio device (e.g., by the processor), causes the device to filter and process signals as described herein. Note that the details of wearable audio device 100 are exemplary of aspects of earphones and headphones and are not limiting of the scope of this disclosure, as the present parasitic oscillation detection can be used in varied types and designs of earbuds, headphones and earphones and other wearable audio devices. Also note that aspects of wearable audio device 100 that are not involved in the parasitic oscillation detection and mitigation are not illustrated in FIG. 3, for the sake of simplicity.

With low-frequency parasitic oscillations (e.g., those in the range of from about 300 Hz to about 1,000 Hz), the onset of feedforward or feedback-based oscillations can be so fast that the system goes from no oscillation to microphone saturation in a matter of milliseconds. In an example the oscillation can saturate the microphone within about five cycles after the onset of the oscillation. As a result, existing oscillation detection algorithms that look for energy in a narrow band may not react quickly enough to detect and suppress the oscillation as the microphone response is saturating. Harmonic distortion sufficient to cause failure of the detector can occur.

In some examples of the present disclosure the processor is programmed to detect parasitic oscillation by determining a fundamental frequency of at least one of the feedforward and feedback microphone signals and comparing an amplitude of the determined fundamental frequency to a threshold level, to determine parasitic oscillation. In some examples the fundamental frequency is determined based on zero crossings of the microphone signal. In an example the fundamental frequency is determined by measuring a number of samples of a running clock between zero crossings. In an example the fundamental frequency is determined based on a monitoring of zero crossings over time. In an example zero crossings are determined based on changes in sign of the microphone signal.

In more specific examples the parasitic oscillation detector is also configured to determine whether the fundamental frequency is at least at a threshold level (amplitude) for at least a predetermined amount of time. In an example the parasitic oscillation detector is configured to detect parasitic oscillations in a predetermined frequency range; this frequency range can be from about 300 Hz to about 1,000 Hz.

In some examples the processor is further configured to mitigate a detected parasitic oscillation or instability. In an example an instability mitigator is configured to alter a microphone signal in response to a determination of parasitic oscillation. In examples the instability mitigator is configured to mute the microphone; the microphone can be muted for a predetermined amount of time. After the predetermined amount of time the microphone can be returned to an un-muted state. Other aspects of mitigation are described elsewhere herein.

Figure 4:
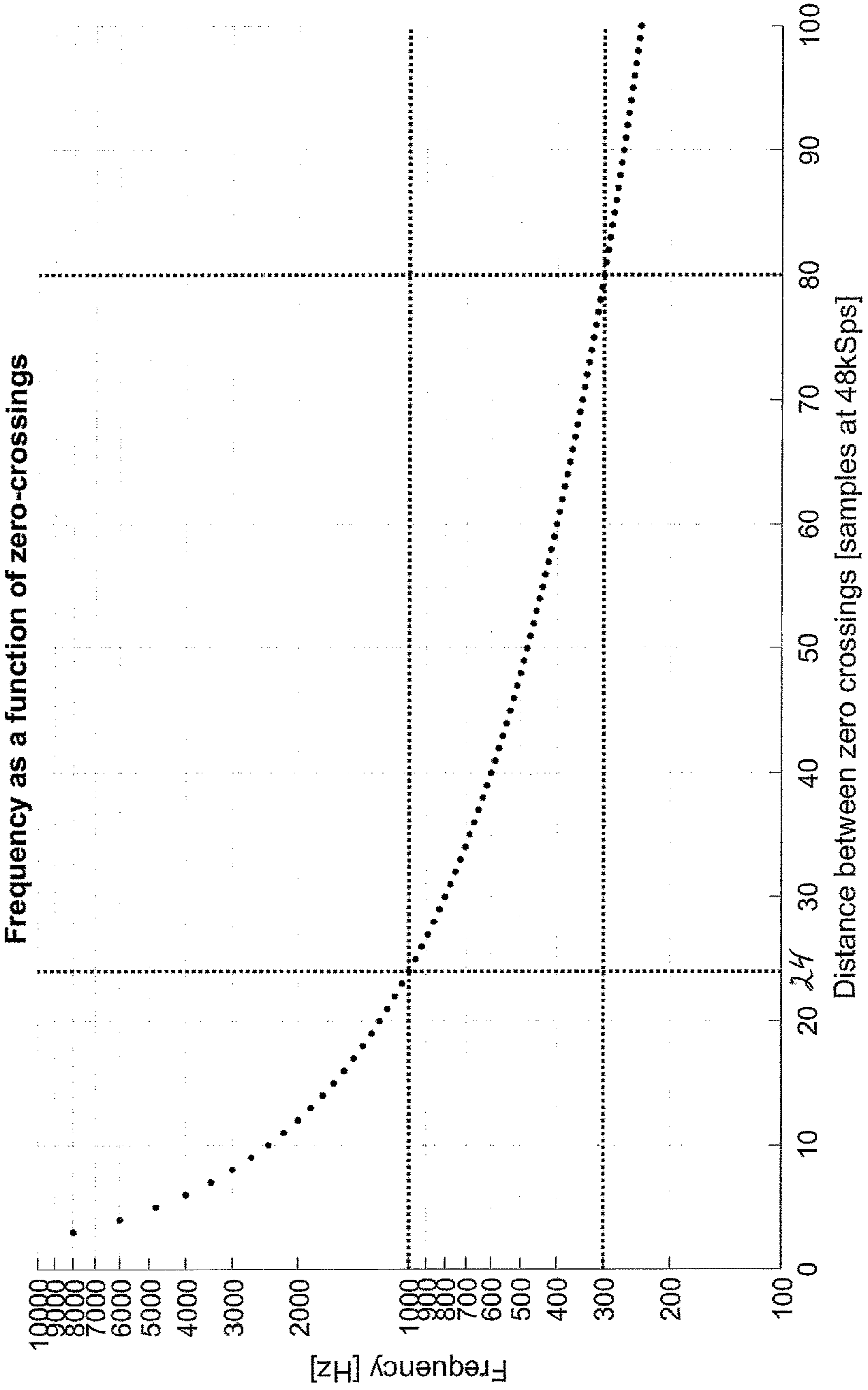
FIG. 4 illustrates frequency as a function of zero crossings.

The processor can be configured to determine the fundamental frequency by detecting zero crossings of a microphone signal. Tonal signals have a fundamental frequency, and the distance between zero-crossings dictates what that fundamental frequency is. In an example the processor maps the distance between zero crossings in integer samples of a clock to a given frequency range. In a specific non-limiting example the processor runs a 48 kHz clock. FIG. 4 illustrates a plot of the determined frequency as a function of the "distance" between zero crossings (measured as the number of clock cycles). In an example the processor is configured to detect fundamentals in the range of 300 Hz (equal to 80 clock cycles between zero crossings) and 1 kHz (equal to 24 clock cycles between zero crossings). The processor is thus configured to monitor zero crossings as a function of time. In an example a zero crossing is detected by detecting a change in sign of the microphone signal, i.e., from positive to negative and vice versa.

Figure 5:
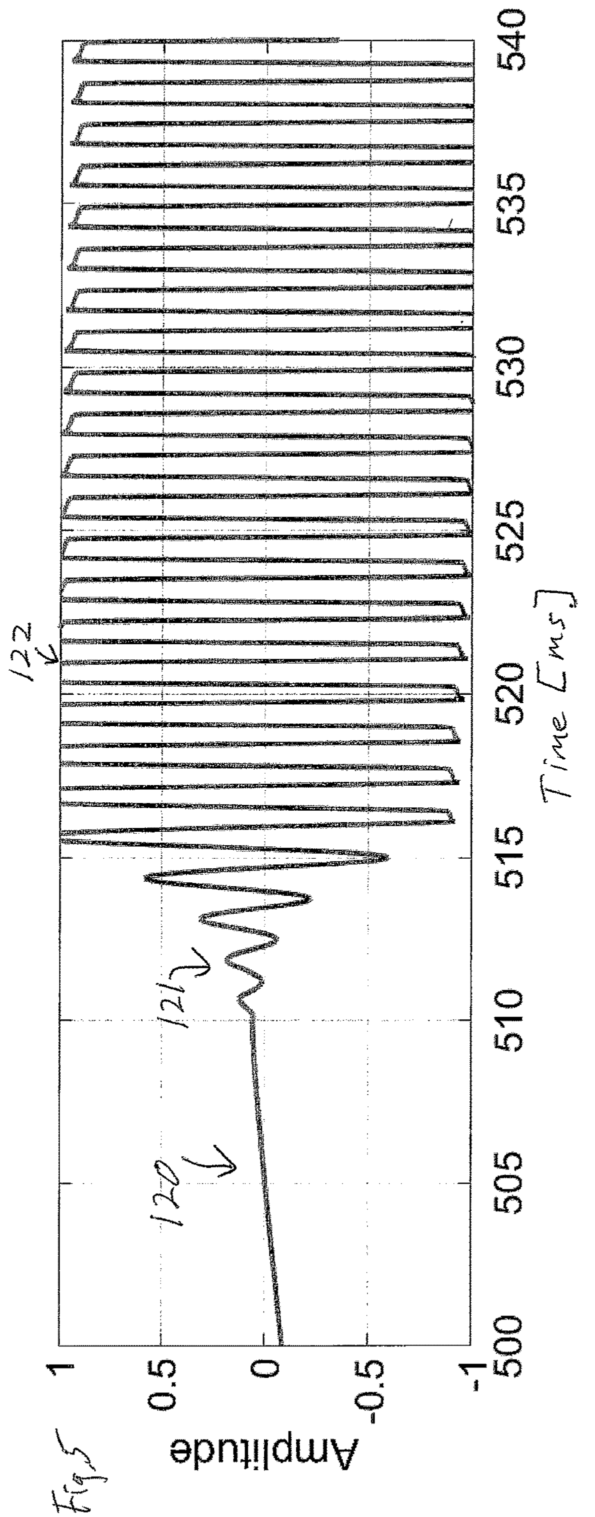
FIG. 5 is a plot of a microphone signal amplitude illustrating microphone saturation caused by unwanted parasitic oscillation.

FIG. 5 is a plot 120 of a feedforward or feedback microphone signal at the onset of a parasitic oscillation where the signal reaches saturation over the course of only about five cycles, or approximately 5 milliseconds. The saturation of the microphone causes the shape of the output waveform to change from a pure tone (a sinusoid, as illustrated in region 121) to more of a square wave due to all of the overtones, as illustrated in region 122 that begins at around 515 ms. Since the saturated output contains a lot of energy at overtone frequencies that may not be monitored by oscillation detection algorithms that look for energy in a narrow band, such low-frequency oscillations may not be detected.

Figure 6:
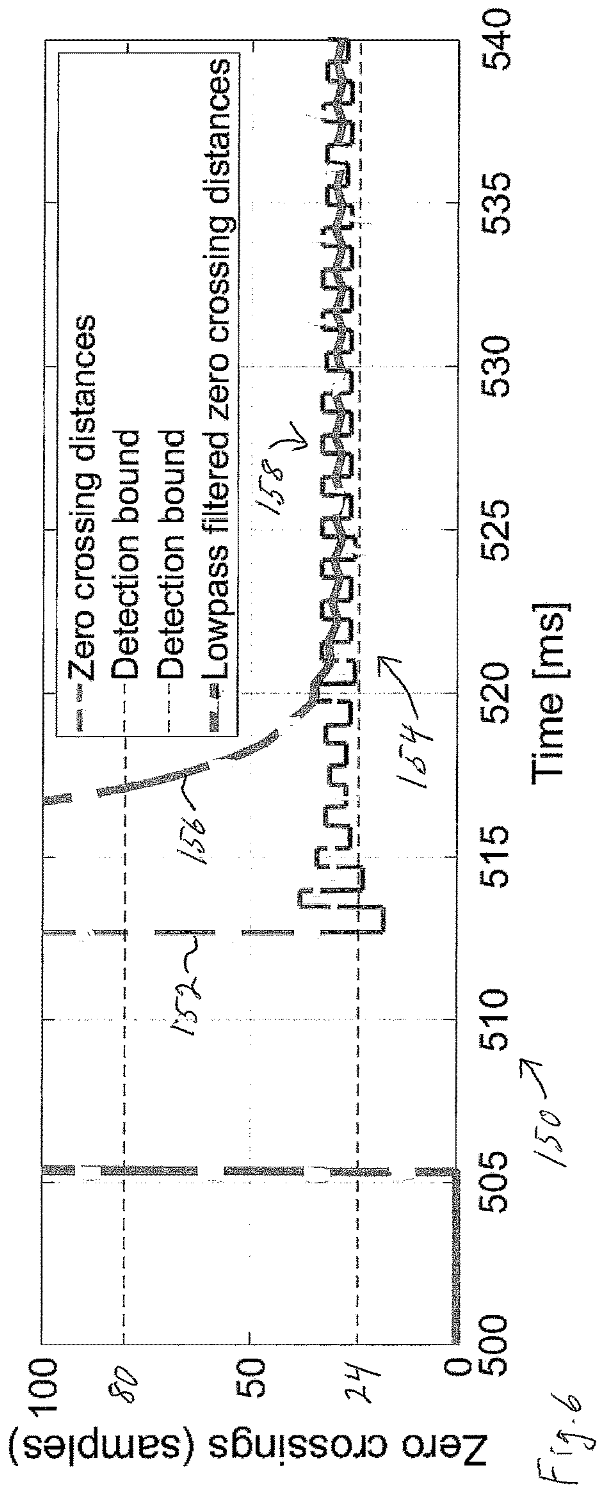
FIG. 6 is a plot of a microphone signal zero crossings, illustrating detection of the fundamental frequency of a low frequency oscillation.

FIG. 6 is a plot 150 of zero crossings over time, corresponding to the microphone signal illustrated in FIG. 5. The determined frequency is a function of the "distance" between zero crossings (measured as the number of clock cycles). In an example the processor is configured to detect fundamentals in the range of 300 Hz (equal to 80 clock cycles between zero crossings) and 1 kHz (equal to 24 clock cycles between zero crossings). The processor is thus configured to monitor zero crossings as a function of time. In an example a zero crossing is detected by detecting a change in sign of the microphone signal, i.e., from positive to negative and vice versa.

Curve 152 is a plot of zero crossing distances (i.e., samples at the sampling clock rate). Beginning around 515 ms and running to 540 ms (region 154) the distances between zero crossings are consistently in the range of about 30 samples, indicative of a fairly stable fundamental frequency. Curve 156 is a plot of low-pass filtered zero crossing distances. The 300 Hz-1.00 Hz bounds are also indicated. When curves 152 and 156 correspond or overlap (as in plot region 158) the system can be more confident that the fundamental frequency has been detected (as compared to detection of a short-term stimulus in which the low-pass filtered plot would not overlap with the plot of zero crossing distances). The idea is that when the absolute value of the difference between curve 156 and curve 152 is below a threshold, there is more confidence that there is relative consistency in the zero crossing frequency. More generally, some type of averaging of the zero crossing measurements can be compared to the instantaneous values, to establish more confidence that a fundamental frequency has been detected.

Another approach for determining the confidence in the zero-crossing based fundamental frequency detection would be to compare a plurality of zero crossing measurements for consistency. For example, the last N zero crossings (which are saved in memory) can be looked at to determine if they all fall within a predetermined range, or that the range (maximum minus minimum) of those values is small. If they do, there is higher confidence that a fundamental frequency has been detected. In an example this consistency-based determination is used in addition to another zero-crossing based fundamental frequency measurement as described herein, as a check or to build more confidence that a parasitic oscillation (which is typically dominated by a single frequency) has been detected.

In some examples the zero-crossing detection is paired with processor logic around absolute magnitude. In an example, if the microphone signal has an amplitude greater than some magnitude at the instantaneous moment when the very fast high onset oscillations are detected, then there is a timer that must be true for some duration of time before a mitigation action is initiated. In one example the mitigation action may be to mute the aware output (i.e., the output from the feedforward microphones) for some duration of time, or until the oscillation is no longer present. In another example the processor is configured to determine a consistency of the detected tone over time. For example the processor could apply a smoothing function (e.g., an exponential smoothing function) to the detected oscillations. The processor could then compare such an averaged magnitude to the instantaneous magnitude. Such a technique can help ensure that a fundamental oscillation frequency has been detected, as compared to an input that is varying (such as a sound that is desired to be sensed). This may help avoid muting environmental and other desirable sounds that should not be cancelled.

Figure 7:
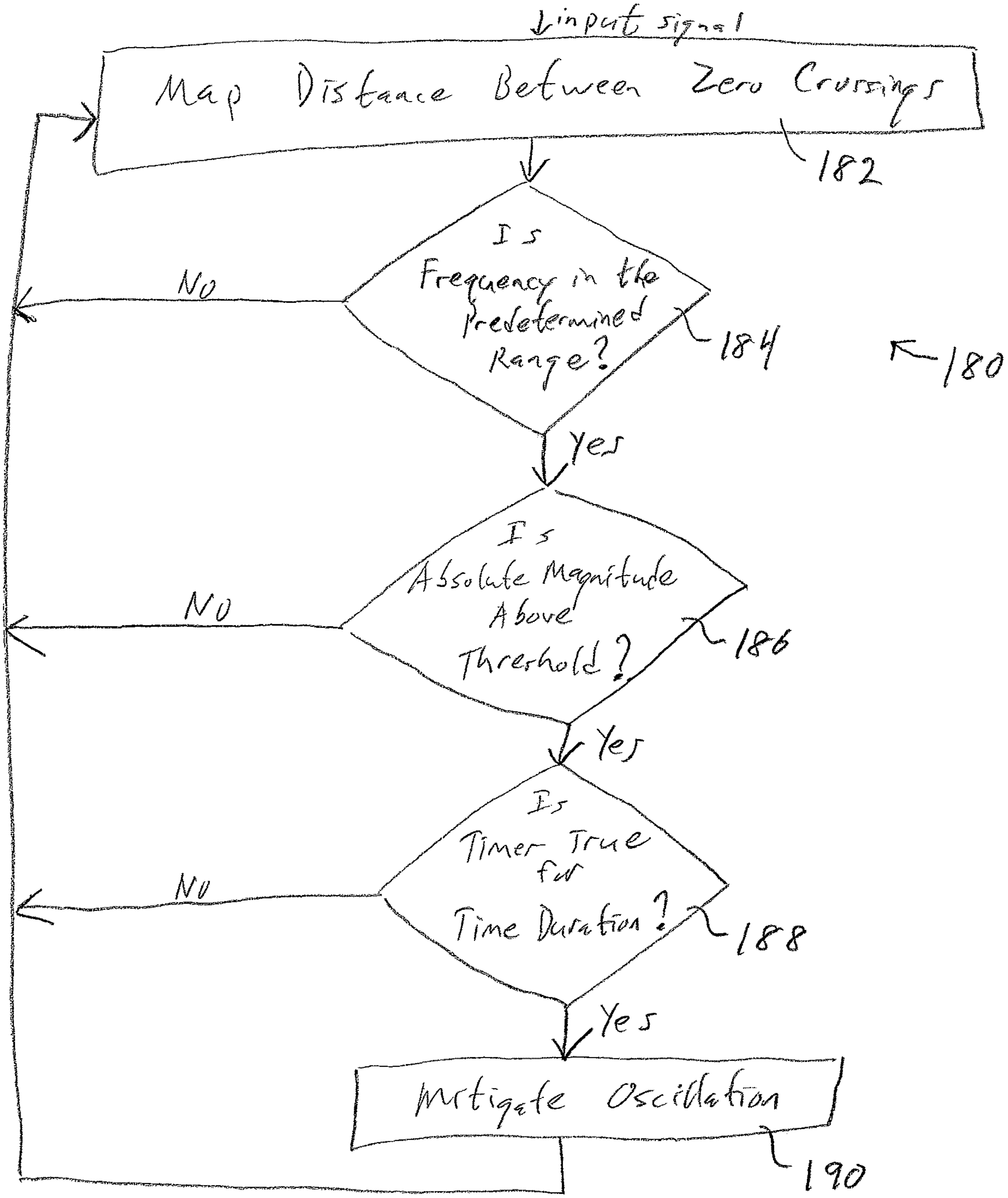
FIG. 7 is a flowchart of an operation of a parasitic oscillation detection and mitigation methodology.

FIG. 7 is a flowchart of an exemplary operation of an earbud parasitic oscillation detection and mitigation methodology 180. In an example all steps are performed by the processor. The operations are thus able to be modified as needed by properly programming the processor. The input signal is the output of the feedforward or the feedback microphone. At step 182 the distance between zero crossings is mapped at the processor sampling speed, as shown in FIG. 4. At step 184 the detected frequency is compared to a predetermined frequency or range of oscillation frequencies to be detected and resolved. If the frequency is in the range, at step 186 the magnitude of the microphone signal is compared to a predetermined threshold. If the signal is above the threshold, at step 188 the processor determines if the signal remains above the threshold for a predetermined time duration. If it does, in some examples the oscillation is mitigated, step 190. If any of steps 184, 186, and 188 are not met, operation returns to step 182 and no mitigation action is taken.

In optional step 190, if an unwanted parasitic oscillation is detected the oscillation is mitigated. A goal is to quickly eliminate oscillations while at the same time not reducing or eliminating desired sounds, even if the mitigation algorithm fires during a false positive event (e.g., an external sound). In an example of step 190, the mitigation action is to mute the microphone, either for a predetermined time that is calculated to avoid the oscillation from reoccurring, or until the oscillation stops. In other examples the mitigation involves adjusting a gain that is applied to the signal from the relevant feedforward or feedback microphone, before the signal is provided to the driver. In one extreme the entire gain applied to the microphone is reduced. However, this can be audible to the user. In some examples the gain is reduced in a more controlled manner, to reduce and eliminate the oscillation. In some examples the gain is reduced (e.g., to zero) gradually over a predetermined period of time, held at the reduced level for a predetermined amount of time, and then increased back to its original value. The increase can be instantaneous, or can be over a predetermined time and can occur gradually over that time. In some examples the adjustment of the gain is frequency dependent. In an example the gain is reduced gradually by about 20 dB, over a period of about 0.5 seconds. In an example the gain is then gradually recovered back to its original value, over about 0.5 seconds. The recovery can take place in a number of steps, so that the user is less likely to detect an anomaly. In other examples the mitigation involves enabling changing the gain of the microphone in another manner, shaping the frequency response of the microphone to reduce the gain, or changing the phase of the microphone in a certain region. Alternatively the mitigation involves enabling an echo canceller.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A method for detecting and mitigating parasitic oscillation in a headphone equipped with an active noise reduction (ANR) system, the method comprising:

determining a fundamental frequency of a microphone signal from a microphone of the ANR system; and comparing an amplitude of the determined fundamental frequency to a threshold level to determine parasitic oscillation; and if parasitic oscillation is determined, then altering the microphone signal to mitigate the parasitic oscillation.

2. The method of claim 1, wherein the fundamental frequency is determined based on zero crossings of the microphone signal.

3. The method of claim 2, wherein the fundamental frequency is determined by measuring a number of samples of a running clock between zero crossings.

4. The method of claim 2, wherein the fundamental frequency is determined based on a monitoring of zero crossings over time.

5. The method of claim 2, wherein the zero crossings are determined based on changes in sign of the microphone signal.

6. The method of claim 1, wherein comparing the amplitude of the determined fundamental frequency to the threshold level to determine parasitic oscillation, comprises determining whether the fundamental frequency is at least at the threshold level for at least a predetermined amount of time.

7. The method of claim 1, wherein determining parasitic oscillations comprises detecting parasitic oscillations in a predetermined frequency range.

8. The method of claim 7, wherein the predetermined frequency range is about 300 Hz to about 1,000 Hz.

9. The method of claim 1, wherein altering the microphone signal comprises muting the microphone signal.

10. The method of claim 1, wherein altering the microphone signal comprises muting the microphone signal for a predetermined amount of time.

11. The method of claim 10, further comprising returning the microphone to an un-muted state after the predetermined amount of time.

12. A method comprising:

mapping a distance between zero crossings of a microphone signal at a processor sampling speed to detect a fundamental frequency of the microphone signal;

comparing the detected fundamental frequency to a predetermined frequency range;

if the fundamental frequency is within the predetermined frequency range, then comparing a magnitude of the microphone signal to a predetermined threshold;

if the magnitude of the microphone signal is above the predetermined threshold, then determining if the magnitude of the microphone signal remains above the predetermined threshold for a predetermined time duration to determine parasitic oscillation; and if the magnitude of the microphone signal remains above the predetermined threshold for the predetermined time duration, then mitigating the parasitic oscillation.

13. The method of claim 12, wherein mitigating the parasitic oscillation comprises altering the microphone signal.

14. The method of claim 13, wherein altering the microphone signal comprises muting the microphone signal.

15. The method of claim 13, wherein altering the microphone signal comprises muting the microphone signal for a predetermined amount of time.

16. The method of claim 15, further comprising returning the microphone to an un-muted state after the predetermined amount of time.

17. The method claim 13, wherein altering the microphone signal comprises adjusting a gain that is applied to the microphone signal.

18. The method of claim 17, wherein altering the microphone signal comprises reducing a gain that is applied to the microphone signal gradually over a first predetermined period of time.

19. The method of claim 18, wherein reducing the gain that is applied to the microphone signal gradually over the first predetermined period of time comprises reducing the gain gradually by about 20 dB over a period of about 0.5 seconds.

20. The method of claim 19, further comprising holding the gain at a reduced level for a second predetermined period of time before increasing the gain back to its original value.

21. The method of claim 20, wherein increasing the gain back to its original value comprises instantaneously increasing the gain back to its original value.

22. The method of claim 20, wherein increasing the gain back its original value comprises gradually increasing the gain back to its original value over a third predetermined period of time.

23. The method of claim 22, wherein the third period of time is about 0.5 seconds.

24. The method of claim 17, wherein the adjustment to the gain is frequency dependent.

25. The method of claim 13, wherein altering the microphone signal comprises shaping a frequency response if the microphone or changing a phase of the microphone in a certain region.

* * * * *